United States Patent [19]

Notenbomer

[11] Patent Number: 5,718,920
[45] Date of Patent: Feb. 17, 1998

US005718920A

[54] PARTICLES FOR BINDING MONOVALENT CATIONS

[75] Inventor: Annette Notenbomer, Rotterdam-Zevenkamp, Netherlands

[73] Assignee: Salternate B.V., Rotterdam, Netherlands

[21] Appl. No.: 647,987

[22] PCT Filed: Nov. 25, 1993

[86] PCT No.: PCT/NL93/00252

§ 371 Date: May 28, 1996

§ 102(e) Date: May 28, 1996

[87] PCT Pub. No.: WO95/14531

PCT Pub. Date: Jun. 1, 1995

[51] Int. Cl.[6] ............................................. A61K 9/14

[52] U.S. Cl. .................. 424/489; 424/483; 424/490; 424/78.1

[58] Field of Search ............................. 424/489, 490, 424/483, 78.1

[56] References Cited

U.S. PATENT DOCUMENTS

| | | | |
|---|---|---|---|
| 4,042,496 | 8/1977 | Tsushima et al. | 210/506 |
| 4,118,336 | 10/1978 | Morishita et al. | 252/316 |
| 4,123,381 | 10/1978 | Morishita et al. | 252/316 |

*Primary Examiner*—Thurman K. Page
*Assistant Examiner*—William E. Benston, Jr.
*Attorney, Agent, or Firm*—Young & Thompson

[57] ABSTRACT

A method and particles for binding monovalent cations, each of the particles having a nucleus containing a cation exchange material, and applied thereon, a coating comprising a membrane being permeable for monovalent cations, in particular sodium, potassium, ammonium and hydrogen ions. The membrane is essentially not disintegrated during passage through the intestinal tract of humans or animals and wherein the membrane is more permeable for monovalent cations than for bi- or higher valent cations.

11 Claims, No Drawings

PARTICLES FOR BINDING MONOVALENT CATIONS

This application is a 371 of PCT/NL93/00252 filed Nov. 29, 1993.

The present invention relates to particles for binding monovalent valent cations, which particles are generally in the form of microcapsules.

In several situations it is desired to lower the amounts of monovalent cations being present in products such as foodstuff or food additives destinated to be consumed by humans or animals. E.g. in EP-B-0150574 it is stated that it is well-known that one of the contributory factors to hypertension end some other diseases is the excessive ingestion of salt, i.e. sodium chloride. This makes circumvention/ prevention of sodium in foods a most important and effective dietetic care for patients suffering from hypertension or renal troubles and those who wish to prevent these diseases. So far these people have been forced to take an unpalatable prescribed diet of an extremely low salty taste. The sodium content of certain foodstuffs can also be reduced by adding a desalinating agent such as an ion exchange resin to the food prior to consumption. This method also results in a low salty taste. Another method for the medical treatment of such a patient is to administrate the patient, preferably after consumption of sodium, a desalinating agent capable of absorbing an excess of sodium ions which may be an acidic ion exchange resin or a weakly acidic ion exchange resin in the potassium form or, in the hydrogen form with the object of removing or mitigating the adverse influences caused by the sodium ions when the patient takes an ordinary meal containing salt in order to give it an acceptable taste. These ion exchange resins are of course inherently not edible and extremely unpalatable for the patients, but also toxic since the resin binds bivalent ions and also other essential compounds. Accordingly, it has been eagerly desired to develop a desalinating agent which in itself is a food ingredient of good palatability end not harmful to humans and animals.

The invention of EP-B-0150574 relates to the use of marine algae as desalinating agents. These materials should, however, be used in relatively large amounts. For instance, for each g of sodium chloride an amount of at least about 20 g of marine algae is needed. The algae material is viscous and bulky since it will be saturated with water, several fold in weight compared to its own weight. Furthermore, the marine algae product is not a reliable desalinating agent in view of lacking stability in the digestive tract. A further disadvantage is that salt will be instantaneously absorbed, which has an adverse effect on the taste. Furthermore bivalent cations will be bound and removed from the body which might lead to mineral exhaustion (depletion).

A method for reducing the salt content of foodstuff solutions and suspensions is described in CH-003158. In this document an ion exchange resin is present in a permeable sachet, made of natural or synthetic fiber sheet, filter paper, porous plastics or perforated metal sheet. Preferably the exchange resin contains calcium, potassium or ammonium ions and the sachet is only half-filled. These sachets are used for reducing the sodium content of soups in special diets. It will be clear that the taste effect of sodium chloride is lost before the soups are consumed.

It is an object of the present invention to provide a material or composition capable of efficiently binding monovalent cations such as sodium ions without the disadvantages of the known materials as discussed in the above.

Additional objects, advantages and novel features of the present invention are set forth in the description that follows, and in part will become apparent to those skilled in the art upon examination of the following description or may be learnt by practice of the invention.

To achieve the foregoing object and in accordance with the purpose of the present invention, as embodied and broadly described herein, there is provided a material consisting of particles for binding monovalent cations, in particular microcapsules, comprising a) a nucleus containing a cation exchanging material and applied thereon b) a coating comprising a membrane being permeable for monovalent cations, in particular sodium, potassium, ammonium and hydrogen ions, wherein said membrane is essentially not disintegrated during passage through the intestinal tract of humans or animals.

The particles according to the invention are a safe means to absorb from the human body specific amounts of sodium in order to allow the consumption of sodium in the diet. In one embodiment a specific amount of sodium is absorbed by the microcapsules and removed from the body. In another embodiment a specific amount of sodium is absorbed while the same amount of added sodium is present in the foodstuff. In this way an overdosis of the cation exchanging material can never be administered.

A surprising advantage of this invention is that the sodium concentration in several parts of the intestinal tract is relatively high (100 mM and higher) so that a strong driving force for the exchange is present. This concentration is (much) higher than the sodium concentration in most foods. The bivalent ion concentration and the $K^+$ concentrations being relatively low.

In general an ion exchanging material will be encapsulated in an ion specific membrane resulting in the particles of the invention. These particles will absorb sodium ions on passage through the intestinal tract and the sodium loaded particles will subsequently be removed from the body simultaneously with the faeces. It is preferred that bivalent cations or higher valent cations are far less efficiently removed by the particles of the invention. Consequently, according to an aspect of the present invention the membrane is also almost not permeable for di- or higher valent cations, the permeation rate of monovalent cations being greater than that of hi- or higher valent cations, preferably at least 20 times greater, in particular at least 10 times greater. In practice the amount of bivalent and higher cations removed from the body is at least a 100-fold less than the monovalent ions.

The cation exchanging material being present in the particles of the invention comprises all types of ion exchanging polymers such as synthetic and natural polymers, food grade and non-food grade materials, strongly charged and weakly charged, biodegradable and persistent, fast as well as slowly absorbing monomers as well as polymers. Preferably the cation exchanging material has been selected from the group consisting of polycarboxylates, polymaleinates, polyacrylates, polyacrylate-co-maleinates and polyphosphates having ion exchanging capacity such as polyphosphates containing 3–1000 phosphate units per molecule, which polyphosphates may be soluble in water or not, (modified) polysaccharides, (modified) cellulose, (modified) starch, (modified) pectins, (modified) alginate, sulphonated polyvinylstyrenes such as Dowex 18880, Dowex 50 X 8, Dowex 8505, Dowex MSC-1, Amberlite 200, Amberlite CG-120, Amberlite IRP-69.

It is preferred that the cation exchanging material is in the monovalent ion form and contains alkali metal ions such as $K^+$, $H^+$, $NH_4$ and $Na^{30}$. If the cation exchanging material is in a higher valent form, e.g. the $Ca^{++}$ form, it will be difficult to have an efficient exchange of ions through a membrane which will be more permeable for monovalent cations than for hi- or higher valent cations. The $Ca^{++}$ and $Mg^{++}$ that will be absorbed by the particles of this invention can be compensated by the packing of (minute) amounts of $Ca^{++}/Mg^{++}$ on the outside of the particles.

As mentioned in the above the particles of the present invention are preferably in the form of microcapsules, which will generally have a diameter in the range of 0.001–10 mm, preferably of 0.01–10 mm, and more preferably of 0.1–1 mm.

According to a further embodiment of the present invention the outer surface of the coating of the particles can be treated with a surface-active substance (surfactant), in general a physiologically acceptable detergent. By such a detergent the particles do not stick together so that it can be applied better to various foodstuffs.

The particles of the present invention may comprise all thinkable combinations of a hard or a soft nucleus (granule) with a hard or a soft coating.

Prior to their use the particles of the invention may be treated with bivalent metal ions such as $Ca^{++}$ or $Mg^{++}$ (i.e. in a solution of a calcium and/or magnesium salt) in order to inactivate "leaking" particles. By such a measure the leak particles are "loaded" with bivalent ions and will be inactive in the intestinal tract of humans and animals.

The particles of the invention may also be used for removing sodium ions from foodstuff including food additives just before consumption or, if desired, before packaging of the foodstuff.

The particles of the invention may also be used as "table top" salt. In a specific embodiment the particles of the invention are mixed with sodium chloride resulting in a table top salt which has the taste of salt but not the disadvantages of sodium ions in the body. With such a table top salt all kinds of foodstuffs such as soup, fried potatoes and meat can be seasoned safely.

It should be noted that the particles of the invention can also be used succesfully in fodder for animals, not only for lowering $Na^+$, but also $K^+$ which is e.g. required in fodders for pigs and poultry to lower the water secretion. Manures with significantly lower water contents are desired in order to lower transport, storage and treatment costs of (excess) manure.

The particles of the invention can also be used in or as pharmaceutical compositions for lowering monovalent cation levels, in particular sodium and potassium ion levels in humans and animals respectively.

The invention also relates to a method for scavenging sodium and/or potassium and/or ammonium ions in the intestinal tract of humans and animals.

The invention also relates to a method removing sodium and/or potassium and/or ammonium ions from products containing such cations, for instance foodstuffs or food additives, wherein the foregoing particles are added to said products, in the case of food products prior to consumption thereof.

The invention also relates to a method for keeping a natural salty $Na^+$ taste, in combination with a low $Na^+$ administration by the application of particles or microcapsules as defined in the above.

The invention also comprises the pharmeceutical use of the particles of the invention, for instance in the form of pills or tablets. It will be evident that such pills or tablets may have various diameters, e.g. in the range of 5–50 mm. In such a use a pill having a diameter of e.g. 25 mm may be dissolved in water prior to swallowing it.

The invention also relates to a method for scavenging sodium and/or potassium and/or ammonion ions from solutions in which other cations ere present.

The invention is further illustrated in the following examples.

EXAMPLE 1

Granulation and coating of K-polyphosphate

In a fluidized bed spray granulator (Glatt, model WSG 15, Fa W Glatt, Hattingen, Germany) the air velocity is regulated by inlet and exit dampers to keep constant relative bed expansion of the order of magnitude of 1.6 corresponding to an air velocity of about 1 m/sec during mixing and the last part of the drying phase. The drying was controled by measuring the difference in temperature between the product and the wet bulb and terminated at a product temperature of about 5 C above the wet bulb temperature of the drying air.

Particle size of more than 90% of the total weight of the polyphosphate was between 20 and 100 micrometers. After about 15 minutes mixing and heating of the starting material (15 kg of polyphosphate Sigma P-8635) the spraying of binder solution was started. The outlet humidity quickly increased to a maximum after which it dropped slightly and was constant during the rest of the spraying time. The granules were cooled by evaporation of the moisture from the surface and when this was saturated by the binder solution the product temperature remained at the wet bulb temperature which depends on the temperature and humidity of the drying air. The binder solution was carboxymethylcellulose (7L1, Hercules) at a concentration of 3%. The application rate was 150 ml per minute. Granulation was carried out for 30 minutes. After granulation the temperature of the inlet air was raised to increase the rate of drying. The desired inlet air temperature during granulation phase was 40° C. and during drying phase 60° C.

Granule size distribution was determined by sieve analysts with a rotating sieve shaker (Retsch, model 330). The granules had an average particle size of 290 micrometer in diameter.

The polyphosphate particles are coated using a fluidized bed coating method, better known as the 'Wurster' method. In contrast to granulators, a Wurster column is characterized by the positioning of the spray nozzle at the base of the coating chamber, and spraying of the coating occurs cocurrent with the gas stream.

The apparatus consists of a vertical, somewhat conical column. A gas (preferably nitrogen) is introduced at the base or constricted part of the column at a velocity high enough to suspend the particles. Cocurrent with the gas stream, a solution of cellulose acetate dissolved in acetone is introduced using a spray nozzle. The gas velocity in the flared part of the column is greatly decreased, so the particles cannot be supported in this region and they fall outward and downward into the constricted region where they are again lifted by the gas flow. When the coating .has reached the desired thickness, the polymer flow through the spray nozzle is shut down and the gas flow continues until the particles are sufficiently dry. The air flow is cut off and the coated product falls to the bottom of the apparatus for collection.

EXAMPLE 2

Coating of Dowex 50X8 by interfacial polymerisation.

The cation exchange resin Dowex 50X8 preequilebrated in a 1 molar KCl solution for 3 hours, is soaked in an aqueous solution of polyethyleneimine(PEI) for 1 minute.

After soaking the resin, the supernatant is removed and the slurry is injected with a syringe into a 0.5% solution of Toluene 2,4-Diisocyanate(TDI) in hexane. At the surface of the resin a polycondensation reaction takes place resulting in a nylon film. The particles can be heat cured at 115° C. for 10 minutes.

40 g of the dried particles is stirred in a 100 ml portion of an aqueous solution that is 100 mM NaCl, 10 mM KCl and 2 mM $CaCl_2$ for various periods of time. After this time the particles are filtered off and the concentration of the metal ions are analysed in each of the filtrate.

| incubation time (minutes) | Ion concentration (mM) in the filtrate | | |
| --- | --- | --- | --- |
| | Na | K | Ca |
| 1 | 98 | 15 | 2.0 |
| 30 | 91 | 21 | 2.1 |
| 60 | 83 | 31 | 1.9 |
| 120 | 68 | 44 | 2.0 |
| 240 | 43 | 72 | 1.9 |
| 480 | 11 | 103 | 1.8 |

The capacity of the particles was determined in a similar way by stirring different amounts of coated particles during 480 minutes in a solution that is of the same concentration as mentioned above. The corresponding flitrates are analysed for their sodium concentration.

| coated particles (g) | Na concentration (mM) |
| --- | --- |
| 40 | 11 |
| 20 | 11 |
| 10 | 13 |
| 5 | 63 |
| 2 | 72 |

EXAMPLE 3

Application in food

Various amounts of coated particles from example 2 are mixed with the standard salt and taste ingredients that are used to enhance the taste of potato crisps. 100 gram portions of crisps are baked in oil and then powdered with the mixtures that have different ratios of the coated particles and NaCl. The particles stick almost all to the crisps at the time the oil is not yet absorbed by the crisp. The NaCl that is powdered on a portion of 100 gram is 1.0 gram.

Each portion of the crisps is soaked in 250 ml of water for 480 minutes, filtered of and the sodium concentration is determined in the filtrate.

| ratio particles/NaCl | Na concentration (mM) |
| --- | --- |
| 0 | 160 |
| 1 | 107 |
| 2 | 44 |
| 4 | 12 |
| 8 | 8 |

To a sachet for making instant soup containing about 12 g dry weight, and containing 2.5 g of NaCl, 2 g of coated particles were added. After mixing 175 ml of boiled water (100° C.) is poured on the soup ingredients in a glass beaker of 250 ml. After a cooldown at room temperature to 40° C. which took about 9 minutes, the temperature is kept constant in a water bath.

| time (minutes) | Na concentration (mM) |
| --- | --- |
| 9 | 220 |
| 30 | 195 |
| 60 | 168 |
| 120 | 113 |

EXAMPLE 4

Tabletop applications 20 grams of the coated particles from example 2 are mixed with 10 gram of normal NaCl. Other mixtures are prepared using higher amounts of NaCl. All of these mixtures can be applied as tabletop salt, by pouring the mixtures on food to be consumed just before consumption in amounts that are desired by personal taste.

I claim:

1. A particle for binding monovalent cations, comprising
   a) a nucleus containing a cation exchanging material; and
   b) a coating on said nucleus comprising a membrane permeable to monovalent cations,
   wherein said membrane is essentially not disintegrated during passage through the intestinal tract of humans or animals and wherein said membrane is more permeable for monovalent cations than for bi- or higher valent cations.

2. The particle according to claim 1, wherein the permeation rate for monovalent cations is at least 10 times greater than that of bi- or higher valent cations.

3. The particle according to claim 1, wherein the cation exchanging material is selected from the group consisting of polycarboxylates, polymaleinates, polyacrylates, polyacrylate-co-maleinates and polyphosphates having ion exchanging capacity and which may be soluble in water or not, polysaccharides, cellulose, starch, pectine, alginate and sulphonated polystyrenes.

4. The particle according to claim 1, wherein the cation exchanging material is in a monovalent form and contains ions selected from $K^+$, $Na^+$, $H^+$ and $NH_4^+$.

5. The particle according to claim 1 in the form of a microcapsule having a diameter in the range of 0.001–10 mm.

6. The particle according to claim 1 in one of a food-stuff, a food additive and a pharmaceutical composition.

7. A method for removing sodium and/or potassium cations from food products containing such cations, wherein particles are added to said products prior to consumption thereof; the particles each having a nucleus containing a cation exchanging material and a coating on said nucleus comprising a membrane permeable to monovalent cations, wherein said membrane is essentially not disintegrated during passage through the intestinal tract of humans or animals and wherein said membrane is more permeable for monovalent cations than for bi- or higher valent cations.

8. A method for scavenging sodium and/or potassium ions in the intestinal tract of humans and animals comprising the steps of bringing particles into the intestinal tract, each of which particles has a nucleus containing a cation exchanging material and a coating on said nucleus comprising a membrane permeable to monovalent cations, wherein said membrane is essentially not disintegrated during passage through the intestinal tract of humans or animals and wherein said membrane is more permeable for monovalent cations than for bi- or higher valent cations.

9. The particle as defined in claim 5, having a diameter in the range of 0.1–1 mm.

10. The particle of claim 2, wherein said membrane's permeation rate for monovalent cations is at least 20 times greater than that for bi- or higher valent cations.

11. The particle of claim 1, wherein said membrane is permeable to sodium, potassium, ammonium and hydrogen ions.

* * * * *